(12) United States Patent
Tsirkin et al.

(10) Patent No.: US 11,822,641 B2
(45) Date of Patent: Nov. 21, 2023

(54) ESTABLISHING CONTROLLED REMOTE ACCESS TO DEBUG LOGS

(71) Applicant: Red Hat, Inc., Raleigh, NC (US)

(72) Inventors: Michael Tsirkin, Lexington, MA (US); Andrea Arcangeli, Imola (IT); Michael Hingston Mclaughlin Bursell, Famborough (GB)

(73) Assignee: Red Hat, Inc., Raleigh, NC (US)

( * ) Notice: Subject to any disclaimer, the term of this patent is extended or adjusted under 35 U.S.C. 154(b) by 473 days.

(21) Appl. No.: 16/862,347

(22) Filed: Apr. 29, 2020

(65) Prior Publication Data

US 2021/0342463 A1 Nov. 4, 2021

(51) Int. Cl.
```
G06F 21/53    (2013.01)
G06F 21/62    (2013.01)
H04L 9/40     (2022.01)
H04L 9/32     (2006.01)
G06F 21/57    (2013.01)
```
(52) U.S. Cl.
CPC .............. *G06F 21/53* (2013.01); *G06F 21/57* (2013.01); *G06F 21/6209* (2013.01); *H04L 9/3236* (2013.01); *H04L 63/0428* (2013.01); *H04L 63/061* (2013.01); *G06F 2221/2141* (2013.01); *G06F 2221/2149* (2013.01)

(58) Field of Classification Search
CPC ......... G06F 21/6209; G06F 2221/2149; G06F 21/53; G06F 21/57; G06F 21/604; H04L 9/3236; H04L 63/0428; H04L 63/061; H04L 63/10; H04L 63/123
See application file for complete search history.

(56) References Cited

U.S. PATENT DOCUMENTS

| | | | |
|---|---|---|---|
| 8,909,928 B2 | 12/2014 | Ahmad et al. | |
| 9,251,368 B2 | 2/2016 | Booth et al. | |
| 9,298,914 B1* | 3/2016 | McCorkendale | ..... G06F 21/552 |
| 10,171,470 B2 | 1/2019 | Burch et al. | |

(Continued)

FOREIGN PATENT DOCUMENTS

| | | |
|---|---|---|
| JP | 5679989 | 3/2015 |
| WO | 2019191072 | 10/2019 |

OTHER PUBLICATIONS

Liu, Dapeng; Xu, Shaochun; Liu, Huafu; "Using Log Files as Knowledge Bases," 2013 Second IIAI International Conference on Advanced Applied Informatics, Los Alamitos, CA, USA, 2013, pp. 80-83, doi: 10.1109/IIAI-AAI.2013.38.*

(Continued)

*Primary Examiner* — Victor Lesniewski
(74) *Attorney, Agent, or Firm* — Lowenstein Sandler LLP

(57) ABSTRACT

Systems and methods are disclosed for establishing controlled remote access to debug logs. An example method may comprise: receiving, by a first computing device, from a second computing device, an encrypted file comprising a debug log; running, within a trusted execution environment of the first computing device, a log access application; sending, to the second computing device, a request for access to the debug log by the log access application, wherein the request comprises a validation measurement generated by the trusted execution environment with respect to the log access application; receiving, from the second computing device, an access key; and accessing the debug log using the access key.

20 Claims, 6 Drawing Sheets

(56) References Cited

U.S. PATENT DOCUMENTS

| | | | |
|---|---|---|---|
| 10,225,152 | B1 | 3/2019 | Roth et al. |
| 10,268,566 | B2 | 4/2019 | Merkle et al. |
| 10,361,868 | B1* | 7/2019 | Baker .................. H04L 9/0877 |
| 10,417,433 | B2 | 9/2019 | Kelso et al. |
| 10,511,636 | B2 | 12/2019 | Vaidya et al. |
| 2002/0112064 | A1 | 8/2002 | Eastvold |
| 2005/0149750 | A1* | 7/2005 | Lisanke .................. G06F 21/10 |
| | | | 726/26 |
| 2006/0075228 | A1* | 4/2006 | Black .................... H04L 63/104 |
| | | | 713/167 |
| 2011/0023019 | A1 | 1/2011 | Aniszczyk et al. |
| 2011/0145659 | A1* | 6/2011 | Ikeyama ............. G06F 11/3476 |
| | | | 714/48 |
| 2011/0202916 | A1 | 8/2011 | VoBa et al. |
| 2011/0231710 | A1 | 9/2011 | Laor |
| 2012/0216052 | A1 | 8/2012 | Dunn |
| 2012/0311477 | A1* | 8/2012 | Mattos ................ G06F 3/04883 |
| | | | 715/777 |
| 2012/0278658 | A1 | 11/2012 | Han |
| 2013/0054680 | A1* | 2/2013 | Nakano ............... G06F 11/3495 |
| | | | 709/203 |
| 2014/0032932 | A1* | 1/2014 | Hiar .................... G06F 12/1408 |
| | | | 713/190 |
| 2016/0011766 | A1 | 1/2016 | Kosaka |
| 2016/0253254 | A1 | 9/2016 | Krishnan |
| 2016/0342499 | A1 | 11/2016 | Cheng et al. |
| 2017/0004066 | A1 | 1/2017 | Lentz et al. |
| 2017/0302458 | A1* | 10/2017 | Berger .................. G06F 21/554 |
| 2019/0042348 | A1* | 2/2019 | Krithivas ............ G06F 11/0784 |
| 2019/0045016 | A1 | 2/2019 | Dewan et al. |
| 2019/0253398 | A1* | 8/2019 | Sun ...................... G06F 21/6263 |
| 2020/0125772 | A1* | 4/2020 | Volos .................... G06F 21/602 |
| 2020/0153629 | A1* | 5/2020 | Yitbarek ................ H04L 9/0897 |
| 2020/0259836 | A1* | 8/2020 | Kumar ................ G06F 21/6209 |
| 2020/0264958 | A1* | 8/2020 | Blass .................. G06F 21/6227 |
| 2020/0394280 | A1* | 12/2020 | del Valle Diharce ..... H04L 9/14 |
| 2021/0209201 | A1* | 7/2021 | Ge .......................... G06F 21/54 |

OTHER PUBLICATIONS

"Debugging Access Controls" <http://servicenowmypath.blogspot.com/2017/10/debugging-access-controls-servicenow.html> retrieved Jan. 2020.

* cited by examiner

US 11,822,641 B2

ESTABLISHING CONTROLLED REMOTE ACCESS TO DEBUG LOGS

TECHNICAL FIELD

The present disclosure is generally related to computer systems, and is more specifically related to establishing controlled remote access to debug logs.

BACKGROUND

Debugging refers to a process of identifying and resolving errors or issues associated with a computer system, such as computer hardware and/or software, which prevent correct operation of the computer system. For many debugging techniques, some type of a computer log file or tracing data may be used.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
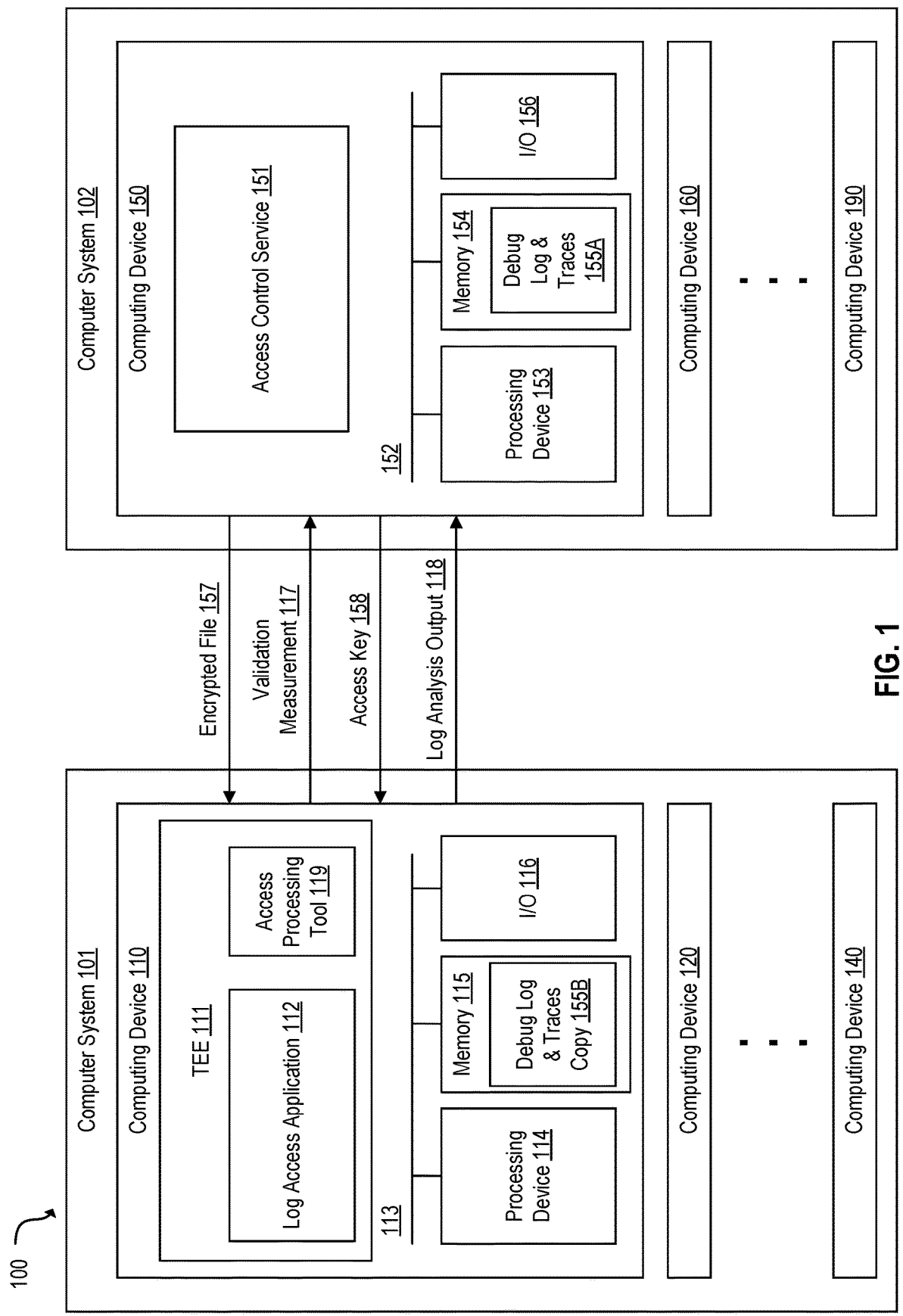
FIG. 1 depicts a high-level block diagram of an example computer system architecture, in accordance with one or more aspects of the present disclosure.

Described herein are methods and systems for establishing controlled remote access to a debug log to identify an issue associated with a computer system. A computer system may include hardware, software, applications, operating systems, and virtual machines, each of which may be susceptible to various errors or issues, often referred to as "bugs." "Debugging" refers to a process of identifying and resolving the bugs associated with the computer system that can prevent correct operation of the computer system. Debugging can involve various techniques, many of which utilize computer log files and/or tracing data (also referred to as "debug logs," "logs," or "log" hereinafter) that record process steps and transactions that occur during the operation of the computer system. A "debugger" can analyze the debug log and identify the bug so the bug can be fixed (e.g., resolved). The debugger can be a software application, a human user (e.g., a developer), or a combination.

For many systems, the debug log may reside on a computing device that is different from the computing device on which the debugger needs to analyze the debug log. For example, a computer product developed by a service provider may be provided to a customer of the service provider for use. The customer may use the computer product on its own computer system or a computer system that is not part of the service provider's computer system. While operating the computer product, the customer may generate one or more debug logs on the computer system where the product is used. In some examples, trace and debug log collection utilities are used to collect the logs. The logs may be stored on a computer system that is not part of the network of the service provider's computer system. When the customer needs an analysis of the debug logs to identify existing bugs, the service provider may supply a debugger to analyze the debug logs and identify the bugs and issues.

In conventional systems, a debugger may gain access to the one or more debug logs in a few ways. Typically, a debugger has access to appropriate tools to analyze the debug logs on the service provider's computer system. Therefore, in order to have access to the debug logs at the service provider's computer system, the debug logs can be transmitted to the service provider's computer system. However, there are usually significant security concerns for transmitting logs directly to another computer system over a network. On one hand, if an entire set of logs are uploaded from one computer system to another computer system over a network, there may be severe security and privacy implications. On the other hand, if logs are uploaded on a selective basis, only uploading requested information, then the process of debugging and effectively resolving the bugs can get delayed and there may be repeated requests for more of the debug logs.

In some situations, a limited Virtual Private Network (VPN) access can be typically arranged that can provide a secure connection, such that either the customer can log into the service provider's computer system, or the debugger can log into the customer's computer system. The process can result in high latency access for the parties. In such cases, instead of obtaining access to the debug log, the customer may be asked to reproduce the bug in that environment. However, reproducing a bug may not be possible or easy enough for the customer. Additionally, a stability issue that causes the bug may also prevent stable VPN connection for accessing the computer system or the debug log. In some other situations, the debug log can be uploaded to a third party secure system (e.g., SpiderOak™), and later give the service provider access to the third party system. However, there is usually latency issue involved with the third party solution and it may be too late to prevent the stability issue that can have meaningful business impact.

Aspects of the present disclosure address the above and other deficiencies by providing technology that can establish controlled remote access to the debug log such that the debug log can be analyzed efficiently, and without exposing the debug log to security threats, while identifying an existing bug. The technology may provide for a first computer system (e.g., a service provider's computer system) to receive one or more debug logs and traces in the form of an encrypted file from a second computer system (e.g., a customer's computer system). After receiving the encrypted file, the first computer system may run, within a trusted execution environment, a log access application that can be used to analyze the debug log. A trusted execution environment may offer execution space within a security enhanced processor, thus increasing the confidentiality and integrity of data of a process or machine from other processes executing on the same processor. The log access application may analyze the debug log automatically based on artificial intelligence, or it may include a user interface to allow a developer to access and analyze the debug log. In some embodiments, the log access application may provide a combination of artificial intelligence and developer input to analyze the debug log.

The first computer system may send a request for access to the debug log to the second computer system. In an example, the request may include a validation measurement (e.g., a cryptographic hash of executable code, or a cryptographic signature) generated by the trusted execution environment with respect to the log access application. Using the validation measurement, the second computer system may validate the log access application running in the first computer system's trusted execution environment. Upon validation, the second computer system may send, to the first computer system, an access key, which may be used for encrypting and/or decrypting the debug log. Using the access key, the first computer system may access the debug log by the log access application and may analyze the debug log in order to identify an issue associated with the debug log. Periodically, for example every three minutes, the log access application may contact the second computer system to verify that the access key has not changed. The second computer system may update the supplied access key at any time in order to update accessibility permissions.

To further enhance security, the first computer system may display a portion of the debug log to a developer analyzing the debug log at a rate that does not cause human-observable latency. That is, not all of the debug logs and traces are displayed to the developer at once, thus preventing potentially leaking a substantial amount of information.

Additionally, the first computer system may provide a report to the second computer system. The report may indicate the identified issue, and may include output of the debug analysis by the log access application. The first computer system may also provide a record of the access history to the debug log by the log access application for auditing as an added security measure.

In an implementation, the second computer system may define a security policy that allows partial access to the debug log. For example, the security policy may dictate that a separate request be made for access to each type of data in the debug log. The first computer system may send a request to the second computer system for access to a specific type of data. The second computer system may assess each request separately and determine whether access to a specific portion of the debug log corresponding to the requested data type is indeed necessary to be allowed. In some embodiments, the access request may be vetted by a human user. Once it is determined that the access request is safe to be granted, the second computer system may send a first access key to the first computer system to access a first portion of the debug log. The first computer system may then use the access key to decrypt a portion of the encrypted file to access the portion corresponding to the requested data type.

The grant of access to the first portion of the debug log may be stored in a cache memory for fast access to the first portion for a subsequent request for the same type of data. Additionally, the first computer system may request a different type of data and the second computer system may provide a different access key to access another portion of the debug log corresponding to the different type of data request. The second computer system may also provide access key updates to block certain access requests.

The systems and methods described herein include technology that enhances the overall performance of computer systems by allowing efficient and timely access to debug logs to resolve system bugs without exposing the debug logs to security risks and privacy concerns. In particular, providing an encrypted file over a network allows the data to be transmitted securely. The validation mechanism may ensure that only an authorized application may gain access to the debug logs, or particular portions of the debug logs, and that access to the debug logs is controlled by the computer system that generated the debug logs. The access keys may provide the benefit of allowing controlled remote access to the debug logs, while allowing access only to an authorized log access application. Thus, the technology improves performance and accuracy of computer systems and decreases security threats associated with remote access of debug logs. Additionally, by granting access to the debug logs that the developer or debugger requires to solve a particular problem, the systems and methods described herein reduce latency associated with current solutions.

Various aspects of the above referenced methods and systems are described in details herein below by way of examples, rather than by way of limitation.

FIG. 1 illustrates a computer system 100 in which embodiments may operate. It should be noted that other architectures for computer system 100 (also referred to herein as system 100) are possible, and that the implementation of a computer system utilizing embodiments of the disclosure are not necessarily limited to the specific architecture depicted by FIG. 1. Terms such as "machine," "device," "computer," and "computing system" may be used interchangeably and synonymously throughout this document.

Computer system 100 may include a single computer system or multiple computer systems arranged in a heterogeneous or homogeneous group (e.g., cluster). Computer system 100 may include one or more computer systems, for example, computer systems 101, 102, etc. in accordance with one or more aspects of the present disclosure. Computer systems 101 and/or 102 may include computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to establish controlled remote access to debug logs. In one example, computer system 100 may include a computing device implemented with x86 hardware. In another example, computer system 100 may include a computing device implemented with PowerPC®, SPARC®, or other hardware. Computer system 100 may include one or more virtual machines and a hypervisor. In some implementations, the computer systems 101 and 102 are often located in a data center.

Each of the computer systems 101 and 102 may include a single or multiple computing devices. For example, computer system 101 may include computing devices 110 to 140, and computer system 102 may include computing devices 150 to 190. Each of the computing devices of computer system 101 may include hardware components 113, such as a processing device 114, memory 115, and input/output interfaces (I/O) 116. Each of the computing devices of computer system 102 may include hardware components 152, such as a processing device 153, memory 154, and input/output interfaces (I/O) 156. Computer system 100 may include additional or different components, devices, and/or connectors in various implementations of the disclosure. Hardware components 113 and 152 may provide hardware functionality for performing various computing tasks.

One or more processors may be embodied as processing device 114 (or processing device 153), which can be a micro-processor, digital signal processor (DSP), or other processing component. Processing device 114 (or 153) may process various received data and may carry out the code or instructions or one or more computer programs, for example, to provide input/output operations specified by the instructions. Processing device 114 (or 153) may be capable of executing the computing tasks described in the present disclosure. Processing device 114 (or 153) may be a single core processor that is capable of executing one instruction at a time (e.g., single pipeline of instructions) or may be a multi-core processor that simultaneously executes multiple instructions. The instructions may encode arithmetic, logical, or I/O operations. In one example, processing device 114 (or 153) may be implemented as a single integrated circuit, two or more integrated circuits, or may be a component of a multi-chip module (e.g., in which individual microprocessor dies are included in a single integrated circuit package and hence share a single socket).

Memory 115 (or memory 154) may include volatile memory devices (e.g., random access memory (RAM)), non-volatile memory devices (e.g., flash memory), ROM (read-only memory), EEPROM (electrically erasable programmable read-only memory), and/or other types of memory devices), and a storage device (e.g., a magnetic hard disk, a Universal Serial Bus (USB) solid state drive, a Redundant Array of Independent Disks (RAID) system, a network attached storage (NAS) array, etc.). Various data of the computer system 100 may be stored in memory 115 or 154. For example, memory 154 is shown to include debug log and traces 155A (also referred to as "debug log 155A"), and memory 115 is shown to include a debug log and traces copy 155B (also referred to as "debug log 155B" hereinafter).

Computer system 100 may include one or more repository (not shown) to store various data. The one or more repository may be hosted by one or more storage devices, such as main memory, magnetic or optical storage based disks, tapes or hard drives, NAS, SAN, and so forth. The one or more repository may be separate from the computer systems 101-102, or the one or more repository may be part of one or more of the computer systems 101-102. In some implementations, the one or more repository may be a network-attached file server, while in other embodiments one or more repository may be some other type of persistent storage such as an object-oriented database, a relational database, a non-relational database, and so forth, that may be hosted by a server machine or one or more different machines coupled to the one or more repository via a network (not shown).

Input/output interface (I/O) 116 (or 156) herein may be and/or include a device capable of providing an interface between a processor and an external device capable of inputting and/or outputting binary data.

In some implementations, computer system 100 may be connected to a network (not shown), which may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Computer systems 101 through 102, including individual computing devices 110 through 190, may be interconnected via the network.

Processing device 114 (or 153) may execute an operating system (OS) (not shown), as well as sub-programs and/or applications of the OS to provide various features and embodiments described herein. The OS on each computing device may support one or more applications, or services residing on the respective computing device. In some examples, an application may include user application processes, virtual machines, containers, and the like. For example, computing device 110 is shown to be running a trusted execution environment (TEE) 111 that includes a log access application 112. In some examples, a service may include a software that performs automated tasks, responds to hardware events, listens for data requests, etc. For example, computing device 150 is shown to include an access control service 151. The applications and services running on the computing devices may receive data through the network (not shown). The OS may provide an abstraction layer for the resources (especially processing device 114 or 153, memory 115 or 154, and I/O devices 116 or 156) that the applications and services may control to perform their function. The OS typically makes these resources available to the applications and services through inter-process communication mechanisms and system calls.

Implementations of the disclosure provide for establishing controlled remote access to debug logs of one computer system by another computer system. In one example, computer system 101 may be a service provider's computer system that supplies one or more computer products for use on a customer's computer system 102. There are various times when the service provider may provide customer support in identifying an issue involving the one or more computer products as it runs on computer system 102. For example, the customer may have experienced a problem or a bug in the past, and needs to identify the bug, resolve the bug, and prevent it from happening again. In another example, the customer may be currently experiencing an issue, and needs to resolve the issue immediately so that the customer is not held up due to the issue, or may identify the issue while it is occurring live. The customer's computer system may accumulate information to track what actions and transactions took place within the computer system and store the information within the customer's computer system 102 to trace the actions. Memory 154 of computing device 150 of customer's computer system 102 includes debug logs and traces 155A that track such information.

In an implementation, computing device 150 may supply to the service provider's computer system 101 a copy of the debug logs and traces 155A in the form of an encrypted file 157. Computing device 150 may create a copy of the debug log and traces 155A and encrypt the copy, thus creating encrypted file 157. Encrypted file 157 may be sent to computer system 101 (or an individual computing device, such as, computing device 110) on an ad hoc basis (e.g., as needed), on-demand by computing device 110 or 150, or on a pre-determined scheduled basis.

In an implementation, computing device 110 may receive encrypted file 157 from computing device 150. Encrypted file 157 may include one or more debug logs and traces, such as debug log and traces copy 155B. In an implementation, the log access application 112 may be supplied within the encrypted file 157. In another implementation, the log access application 112 may be supplied separately from the encrypted file 157. Computing device 110 may be running a trusted execution environment (TEE), which provides security and confidentiality to the processes running within it. In one example, TEE 111 may be configured to execute log access application 112.

In an implementation, trusted execution environment 111 may contact a service provided by computer system 102, which may validate that the trusted execution environment 111 is running log access application 112. In an example, access processing tool 119 of computing device 110 may contact access control service 151 of computing device 150. Access processing tool 119 may transmit validation measurement 117 to access control service 151. Validation measurement 117 may be generated by trusted execution environment 111 with respect to log access application 112. In an example, validation measurement 117 may be a cryptographic hash of executable code of the log access application. Validation measurement 117 may ensure that log access application 112 is indeed executed in trusted execution environment 111. In an example, log access application 112 running on computing device 110 may be considered to be an authorized application, and the identification based on validation measurement 117 that log access application 112 is running on computing device 110 may ensure that an authorized application is to be given access to encrypted file 157.

In an example, the log access application 112 may be an application that has been particularly authorized by the computer system 101 and/or computer system 102 to access the debug log. The notation that the log access application is an authorized application may be stored in a storage component, such as, memory 115 and/or memory 154. In some examples, an identification of the computing device 110 may be stored on a storage component to indicate that a log access application running on the computing device is an authorized application. The log access application 112 is thus a trusted application that may ensure secured handling of the debug log. Granting access to the log access application 112 may minimize security and privacy risks associated with remotely sharing the debug logs otherwise.

Upon validating the trusted execution environment, computer system 102 may transmit access key 158 to computing device 110. In an implementation, access key 158 may be used to as a decryption key to decrypt the encrypted file 157. Additionally or alternatively, computer system 102 may transmit a separate decryption key to decrypt the encrypted file 157. In an implementation, access processing tool 119 may receive an indication granting access to encrypted filed 157 from computer system 102. In some examples, receiving the indication granting access includes receiving access key 158, which may allow log access application 112 to decrypt encrypted file 157. Log access application 112 may further save a copy of the decrypted debug log and traces in memory 115 (shown as debug log and traces copy 155B in FIG. 1).

Access key 158 may be used to control access to log access application 112. Access key 158 may be particularly designed to be usable only by log access application 112. In an example, access processing tool 119 may pass access key 158 to log access application 112 to control access to the debug logs 155B. Thus, access key 158 may provide a controlled access mechanism for debug logs that are generated by a computer system that is remote from computer system 101, as access key 158 limits access to the debug logs to an authorized (e.g., trusted) log access application.

On the other hand, if it is determined that TEE 111 is not executing log access application 112, access control service 151 may deny the request for validation. If the access request is denied, the computer system 101 may not access the debug logs despite having possession of the encrypted file 157, ensuring access to the debug logs is granted only to authorized and validated system components and not to unauthorized or unknown components.

In an implementation, computer system 102, and specifically computing device 150 as shown in the example of FIG. 1, receives the request from computer system 101 for access to the debug logs 155B by log access application 112. In an implementation, access control service 151 receives and handles the access requests. However, other components of computer system 101 or computer system 102 may also handle access requests. In one example, the request accompanies the validation measurement 117 associated with the computer system 101. If access control service 151 determines that TEE 111 is running the trusted log access application 112, then access control service 151 may grant the request for access to the set of debug logs 155B by the trusted log access application 112. In an example, access control service 151 may send an access key 158 to the second computer system 101 when access is granted. In one example, the access key 158 may be used for decrypting the encrypted file 157. In one example, access key 158 may be time limited, such that it expires after certain time, and such that it may not be used for accessing the debug logs after a certain time. In that case the computing device 110 may need to send another request for access for accessing the debug logs after the certain time. Access control service 151 may provide access key updates to computer system 101 in order to block access to the debug log and traces copy 155B, thus ensuring controlled access to the debug logs.

The log access application 112 may generate and provide an output, such as log analysis output 118, to the computer system 102 to report the identified issue based on the analysis of the debug logs.

Log access application 112 may display a portion of the debug log 155B on a graphical user interface. In one example, a portion of the output may be provided for display to a developer in order to limit exposure to security threats. In some examples, the portion of the output may be limited to a specific amount of data. For example, a threshold amount of data, or number of records, may be defined in the system and the portion of the output provided may correspond to an amount, or number, that is less than the threshold amount, or number, to be displayed within a specified amount of time. For example, less than ten records may be provided for display per second. The threshold may be set such that the display rate does not cause a human observable latency in displaying the output.

In an example, the computing device 110 may also provide, to computer system 102, a record of access to the debug logs 155B by the log access application 112. The record may be used to identify any unauthorized, unintended, or unnecessary access that has taken place. The record may be considered for deciding whether to continue to provide access to the debug logs, or remove current access to the debug logs and/or to deny subsequent access requests.

Computer system 100 may further include, although not specifically illustrated herein, a system bus or other communications mechanism for communicating information data, signals, and information between various components (e.g., FO 116 or 156, memory 115 or 154, etc.) of the system 100. System bus may transfer data between components inside the system 100 utilizing one or more connections, such as parallel or serial bit connections.

Figure 2:
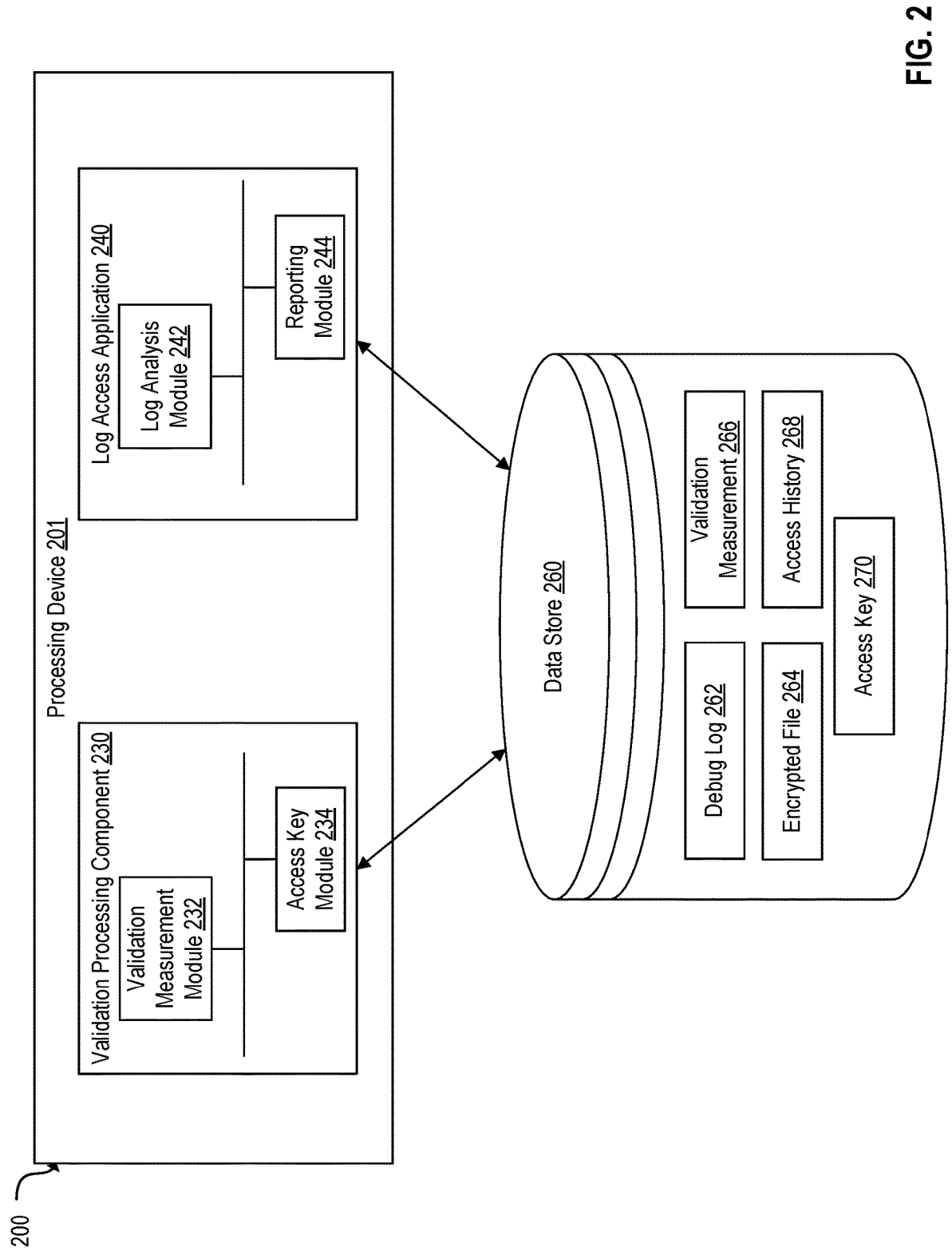
FIG. 2 depicts a block diagram of an example computer system for establishing controlled remote access to debug log(s), in accordance with one or more aspects of the present disclosure.

FIG. 2 is a block diagram illustrating example components and modules of the computer system 200 in accordance with one or more aspects of the disclosure. Computer system 200 may be the same or similar to the computer system 101 described with respect to FIG. 1. For example, computer system 200 may include a computing device 110. Computer system 200 may include a data store 260 and a processing device 201 operatively coupled to the data store 260. Processing device 201 may include a validation processing component 230 and a log access application 240. Validation processing component 230 may include a validation measurement module 232 and an access key module 234. Log access application 240 may include a log analysis module 242 and a reporting module 244. Each of the validation processing component 230 and the log access application 240 may include additional and/or different modules and submodules.

In some implementations, data store 260 may be the same as, or similar to, memory 115. Data store 260 may store debug log 262 (may be the same as, or similar to, debug logs and traces 155A and 155B), encrypted file 264 (which may be the same as, or similar to, encrypted file 157), validation measurement 266 (which may be the same as, or similar to, validation measurement 117), access key 270 (which may be the same as, or similar to, access key 158), access history 268, etc.

In one implementation of the disclosure, validation measurement module 232 of validation processing component 230 may transmit validation measurement 266 to computer system 102 to validate the log access application 240 running within a trusted execution environment. The validation measurement 266 may be a cryptographic hash of executable code of the log access application 240. Computer system 102 may validate that the trusted execution environment is executing log access application 240 using validation measurement 266. In an example, if the cryptographic hash of executable code of log access application 240 matches the hash of the original log access application file, computer system 102 may validate the log access application running in the trusted execution environment. As a result, access key module 234 of validation processing component 230 may receive access key 270 from computer system 102.

In one implementation, log analysis module 242 of log access application 240 may use access key 270 to decrypt encrypted file 264. In one example, a debugger (e.g., a human developer, a software application, or a combination) may use log analysis module 242 to analyze debug log 262 to identify an issue associated with the debug log 262. In one implementation, the log analysis module 242 itself may analyze the debug 262 to identify an issue associated with the debug log 262. The issue may be a bug that is impacting computer system 102.

Log analysis module 242 may generate an output of the debug log 262 for the developer to analyze. The output may be provided for display on computer system 101, for example, and may correspond to an amount that is less than a threshold amount of data to be displayed within a specified amount of time.

Log analysis module 242 may also generate an analysis output. Reporting module 244 may provide to computer system 102 the analysis generated by log analysis module 242. Reporting module 244 may also provide a record of access history 268 to the debug log 262 by the log access application 240 for auditing by the first computer system as added security measures. Access history 268 may be used to identify any unauthorized, unintended, or unnecessary access to debug log 262 that has taken place, and be taken into consideration for deciding whether to remove access to the debug log 262 and/or to deny subsequent access requests.

Figure 3:
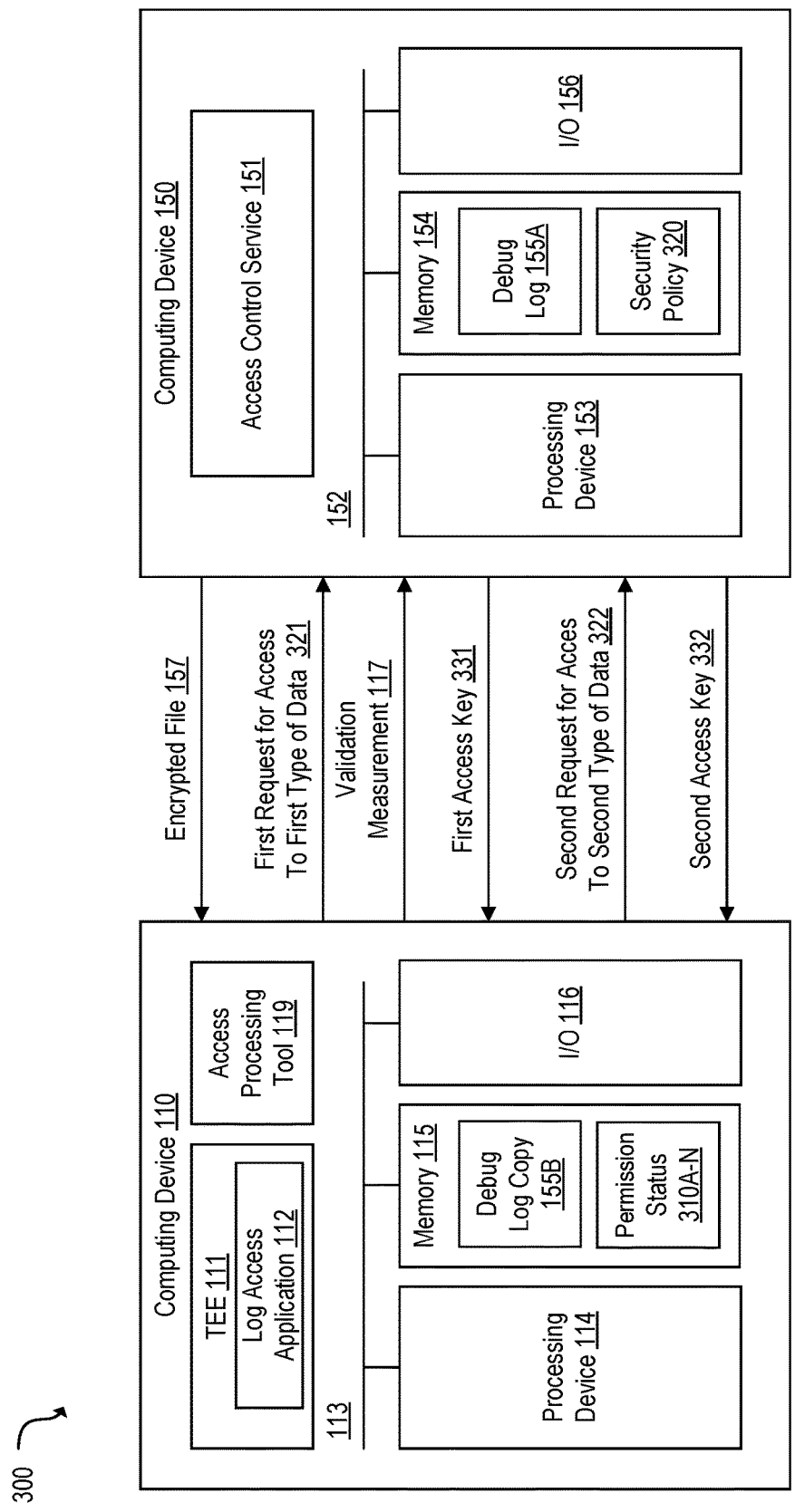
FIG. 3 depicts a block diagram of an example computer system for establishing controlled remote access to portions of a debug log, in accordance with one or more aspects of the present disclosure.

FIG. 3 depicts a block diagram of an example computer system 300 for establishing controlled remote access to portions of a debug log, in accordance with one or more aspects of the present disclosure. Computer system 300 may be the same or similar to the computer system 100 described with respect to FIG. 1. For example, computer system 300 may include computing device 110 and computing device 150. Components within the computing devices 110 and 150 are also depicted to be same as those depicted in FIG. 1. In the implementation with respect to FIG. 3, the interactions between computing devices 110 and 150, including the mechanism to provide access to debug log copy 155B, may be different than that described with respect to FIG. 1, and the additional and different subject matter is largely described with respect to FIG. 3.

In an implementation, computing device 110 is running a trusted execution environment (TEE) 111. Computing device 110 may receive, from computing device 150, encrypted file 157, which may include the debug log copy 155B. In an embodiment, log access application 112 may be supplied within encrypted file 157. TEE 111 may run log access application 112 to analyze the debug logs 155B (e.g., in the same way as described with respect to FIG. 1). In an implementation, computing device 110 may send a first request to computing device 150 for access to a first type of data associated with the debug log 155B by log access application 112, as shown via arrow 321. In an example, the first type of data may include a type of data associated with a specific function or task. For example, the first type of data may include journal log data, interface data, SQL log data, etc. In some examples, the first type of data may overlap with and/or share another type of data. In an example, computing device 110 may transmit validation measurement 117 along with the first request for access to the first type of data. Validation measurement 117 may include a cryptographic hash of executable code of the log access application 112, generated by the trusted execution environment 111, as described previously with respect to FIG. 1.

In an example, computing device 150 may define a security policy 320 for allowing partial access to the debug logs 155B. Computing device 150 (for example, access control service 151) may examine the first request received from computing device 110, and based on the security policy, determine whether the access request should be granted. This determination may be made along with the validation of log access application 112 using the validation measurement 117. Security policy 320 may identify the types of data for which access may be granted or denied, and the extent of access to provide. For example, security policy 320 may identify particular portions of the debug log corresponding to particular types of data. Security policy 320 may indicate how data can be accessed for a data type that share data with another data type. Security policy 320 may restrict or limit access to certain types of data, limit the rate at which the data can be accessed, how long the data can be accessed, etc. Security policy 320 may restrict access to certain types of users or applications. Various types of policies, including those not described herein, may be included in security policy 320 to control access to the debug logs of computing device 150.

Access control service 151 may grant access to a first portion of the debug logs 155B upon successful validation that TEE 111 is running authorized log access application 112 and that the request complies with security policy 320.

The first portion of the debug logs 155B may correspond to the first type of data. Granting access to the first portion of the debug logs 155B may include sending a first access key 331 to access the first portion of the debug logs 155B of encrypted file 157. Access to the first portion may not allow access to other portions of the debug logs other than the first portion.

In an example, access processing tool 119 may receive a first indication from the computing device 150 granting access to the first portion of the debug logs 155B. In one example, the first indication granting access to the first portion of the debug log is stored in memory 115 (for example, in a cache memory portion of memory 115) for automatically and quickly granting access to the first portion of the debug log for a subsequent request for access to the first type of data corresponding to the first portion. For example, the grant indication may be stored in the memory 115 as one of the permission status 310A-N, which may include information such as first type of data, first portion of debug log, access status (e.g., granted, denied, pending, etc.), expiration time, etc. Using the permission status 310A-N may allow fast access to debug logs and traces of the same type in subsequent requests after one slow round trip to the access control service 151 from and to computing device 110 to request and grant the access. Upon granted access, log access application 112 may analyze the first portion of the debug logs 155B to identify a first issue associated with the first type of data.

In an example, computing device 110 may send a second request to computing device 150 for access to a second type of data associated with the debug logs 155B for the log access application 112, as shown by arrow 322. The second request may come from a debugger running on computing device 110, or from a developer using log access application 112, for example. In one embodiment, log access application 112 may analyze the debug logs 155B to identify issues. Access control service 151 may determine, similar to the first request, whether access should be granted according to security policy 320 as it relates to the second type of data, and in view of a validation measurement received with the second request. The validation measurement received with the second request may be the same as the validation measurement received with the first request, or it may be different.

Access control service 151 may grant the access to the second portion. Access processing tool 119 may receive a second indication from the computing device granting access to a second portion of the debug logs 155B for the log access application (along with sending second access key 332 to computing device 110), wherein the second portion of the debug logs 155B represents the second type of data. The grant indication may be stored in permission status 310A-N. Log access application 112 may be used to analyze the second portion of the debug logs to identify a second issue associated with the second type of data associated with the debug logs. In another example, a second request for access to a second type of data may be denied by the access control service 151. Thus, computing device 150 is provided with a mechanism that allows controlling access on a granular level, minimizing security threats and risks. In some implementation, requests for access to the different types of data may be logged by computing device 150 and vetted by a human user, if necessary, before granting or denying an access request.

With computing device 110 periodically contacting access control service 151 for requesting access, it is possible for computing device 150 to shut down access at any time, and later restore access voluntarily. Computing device 110 may contact computing device 150 every three minutes, for example, or at some other periodic interval that does not cause latency for the developer. Computing device 150 may shut down access to the debug logs 155B at any time by transmitting updated access keys, for example, thus resulting in denial of access to the debug logs 155B by the access control service 151.

Figure 4:
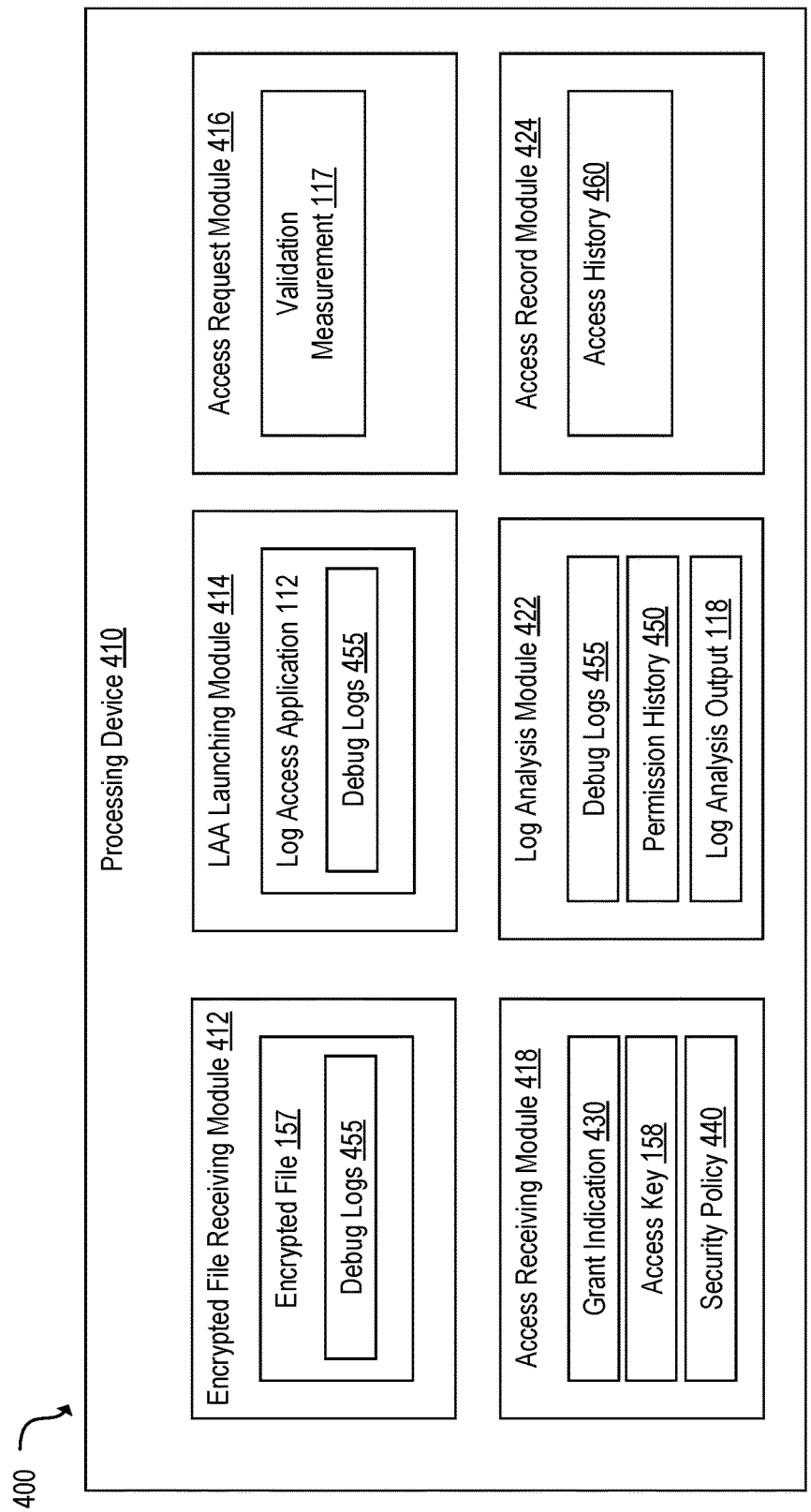
FIG. 4 depicts a block diagram of an example apparatus in accordance with one or more aspects of the present disclosure.

FIG. 4 illustrates a block diagram of an example apparatus 400 in accordance with one or more aspects of the present disclosure. The apparatus 400 may be the same or similar to components within computer system 101 of FIG. 1, computer system 200 of FIG. 2, or computing device 110 of FIG. 3. Apparatus 400 may be the same or similar to the computing device 110 described with respect to FIG. 1. In some implementations, the apparatus 400 may comprise hardware (circuitry, dedicated logic, etc.), software (e.g., software executed by a general purpose computer system or a dedicated machine), or a combination of both. In some implementations, the apparatus 400 may include processing device 410 that may execute instructions for carrying out the operations of the apparatus 400 as discussed herein. As shown, the apparatus 400 may execute instructions for an encrypted file receiving module 412, a log access application (LAA) launching module 414, an access request module 416, an access receiving module 418, a log analysis module 422, and an access record module 424, to establish a controlled remote access to debug logs. All of these modules may run within a trusted execution environment of processing device 410. In one implementation, as depicted in FIG. 4, the operations of the modules of apparatus 400 are same or similar to individual components and/or modules of FIG. 2. For example, in one implementation, the operations of log analysis module 422 may be identical to the operations of log analysis module 242.

In one implementation, components of apparatus 400 may execute instructions for carrying out operations to establish controlled remote access to one or more debug logs to allow a log access application to analyze the logs to provide indication of an issue in view of the logs. In another implementation, the components of apparatus 400 may carry out additional or different operations. For example, apparatus 400 may execute instructions to carry out operations to request access to a first type of data associated with the debug logs and allow a debugger to analyze the a first portion of the debug logs to identify a first issue associated with the first type of data, and further request access to a second type of data associated with the debug logs and allow a debugger to analyze a second portion of the debug logs to identify a second issue associated with the second type of data.

In one example, processing device 410 may represent a processing device of a first computing device (such as the processing device 114 of computing device 110 of FIG. 1). In operations of apparatus 400 in the example, encrypted file receiving module 412 may provide for a means for receiving encrypted file 157 from a second computing device, such as computing device 150 of FIG. 1. Encrypted file 157 may include one or more debug logs, such as debug logs 455 (similar to debug log 155A or 155B of FIG. 1). In one embodiment, encrypted file 157 may include the log access application 112.

LAA launching module 414 may provide for a means for launching a log analysis application within the trusted execution environment of the first computing device. The log access application may analyze the debug logs 455, or may allow a developer to analyze the debug logs 455. For example, log analysis module 422 may represent, or be part of, the trusted log access application. The launched log access application may be the same as log access application 112 in FIG. 1 and FIG. 3 and/or log access application 240 in FIG. 2.

The access request module 416 may provide for a means for sending a request to the second computing device to seek access to the debug logs 455 by the trusted log access application. In one example, access request module 416 may transmit validation measurement 117 associated with apparatus 400 along with the request for access to the debug logs 455. In one example, validation measurement 117 may include a hash of executable code of the log access application 112 supplied by apparatus 400 to indicate that the trusted execution environment is executing the log access application.

Access receiving module 418 may provide for a means for receiving a grant indication 430 from the second computing device granting access to the debug logs 455 by the trusted log access application. Grant indication 430 may accompany an access key 158 to access the debug logs 455 of the encrypted file 157. Additionally or alternatively, grant indication 430 may transmit a decryption key separate from the access key to decrypt the encrypted file 157. In one implementation, processing device 410 may receive and store security policy 440 (e.g., from computing device 150). Security policy 440 may indicate how partial access to the debug logs 155B may be handled.

The log analysis module 422 may provide for a means for analyzing, by the trusted log access application, the debug logs 455 to identify an issue associated with the debug logs 455. In an example, the log analysis module 422 may provide, to the computing device, a log analysis output 118, or a portion of it, generated by the log analysis module 422 to report the identified issue in view of analyzing the debug logs 455. The log analysis module 422 may store permission history 450 tracking one or more times that grant indication 430 is received to access the debug logs 455 for automatically granting access to the debug logs 455, or to a portion of it, for a subsequent request.

Access record module 424 may provide for a means for providing, to the second computing device, a record of access (e.g., access history 460) to the debug logs by the log access application. Access history 460 may be used to identify any unauthorized, unintended, or unnecessary access to debug logs 455.

Figure 5:
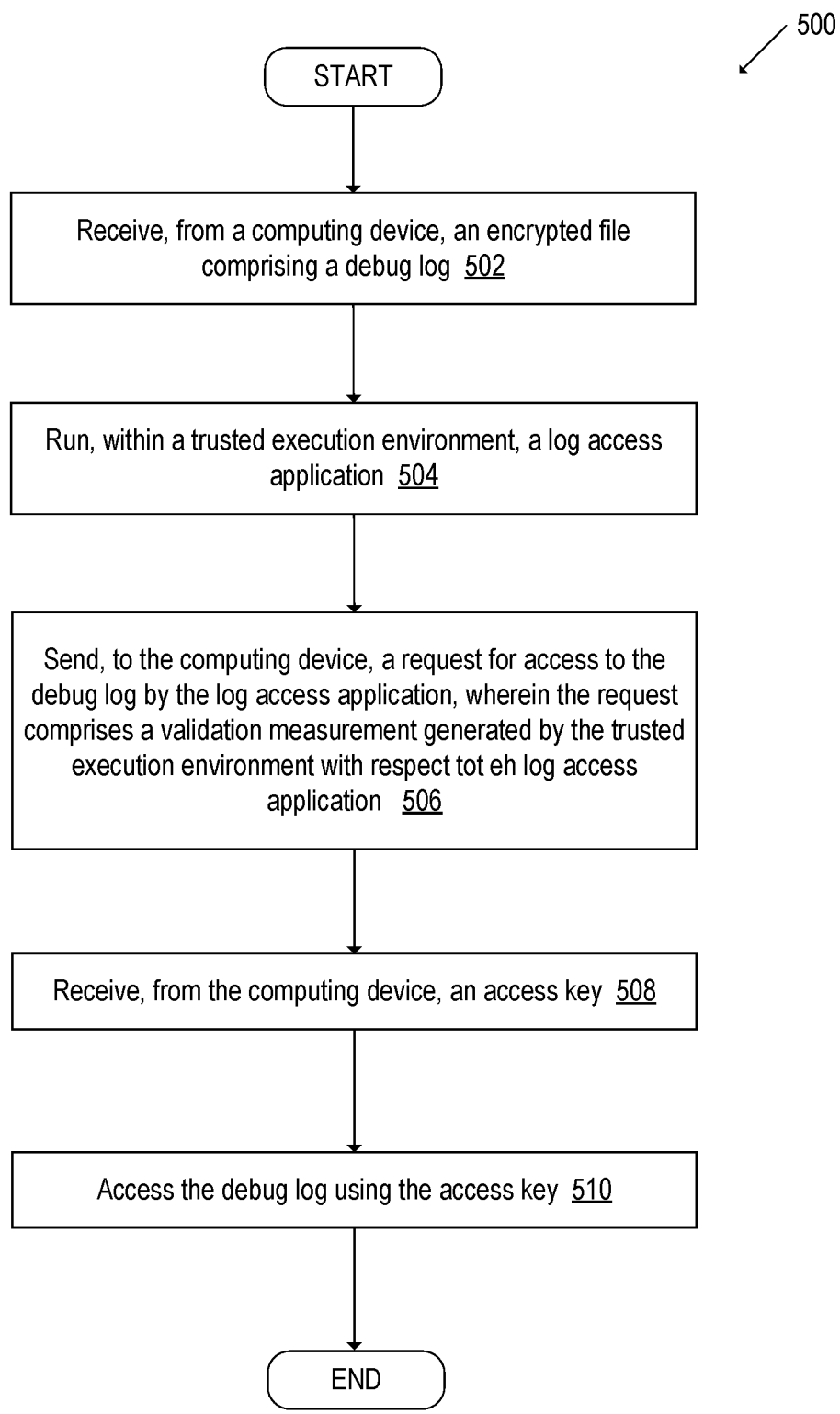
FIG. 5 depicts a flow diagram of an example implementation of establishing controlled remote access to a debug log, in accordance with one or more aspects of the present disclosure.

FIG. 5 depicts a flow diagram of an example method 500 for establishing controlled remote access to a debug log, in accordance with one or more aspects of the present disclosure. In one implementation, method 500 may be performed by the log access application 112 and/or access processing tool 119 as described herein. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of the computer system 100. It should be noted that blocks depicted in FIG. 5 can be performed simultaneously or in a different order than that depicted.

Referring to FIG. 5, at block 502, the processing logic receives, from a computing device, an encrypted file that includes a debug log. The debug log may be used to track actions and transactions that take place while various operations are performed using the computing device.

At block 504, the processing logic runs, within a trusted execution environment (TEE), a log access application. The log access application may be used to analyze the debug log. The log access application may be an application that has been particularly authorized to access the debug log and allow a developer or debugger to perform log analysis.

At block 506, the processing logic sends to the computing device a request for access to the debug log by the log access application. In one example, the processing logic may transmit a validation measurement generated by the trusted execution environment along with the request for access to the debug log. The validation measurement may include a cryptographic hash of executable code of the log access application. If the hash of executable code matches the executable code on the computing device, the computing device may grant access to the debug log by transmitting an access key.

At block 508, the processing logic receives, from the computing device, an access key. The access key represents an indication from the computing device granting access to the debug log. The access key may be used to decrypt the debug log, or a portion of the debug log. Having the access key allows a developer or debugger to analyze the debug log using the log access application to identify an issue associated with the debug log.

At block 510, the process logic accesses the debug log using the access key. The processing logic may provide access to a portion of the debug log. The portion may be provided for display to the developer corresponding to an amount of data that is less than a threshold amount of data that is to be displayed within a specified amount of time. The process logic may further provide, in view of the debugger's analysis of the debug logs, output to report the identified issue. Furthermore, the processing logic may provide, to the computing device, a record of access to the debug log by the log access application. The record may be used to identify any unauthorized, unintended, or unnecessary access that has taken place, and be considered for deciding whether to remove access to the debug logs and/or to deny subsequent access requests.

Figure 6:
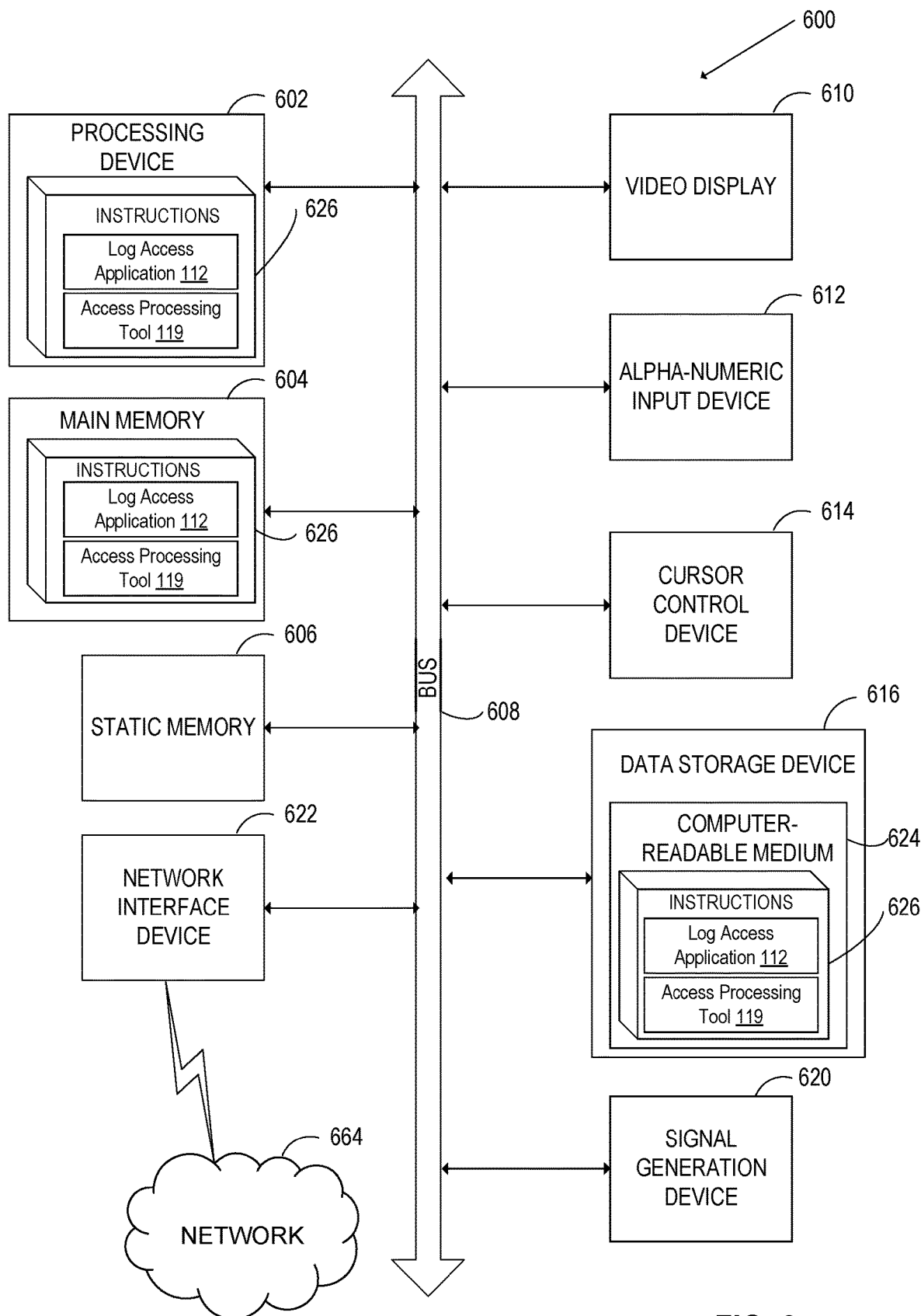
FIG. 6 depicts a block diagram of an illustrative computing device operating in accordance with the examples of the present disclosure.

FIG. 6 illustrates a diagrammatic representation of a machine in the example form of a computer system 600 within which a set of instructions, for causing the machine to perform any one or more of the methodologies discussed herein, may be executed. In various illustrative examples, computer system 600 may correspond to the computer system 200 of FIG. 2 or apparatus 400 of FIG. 4. In some implementations, the computer system 600 may support establishing controlled remote access to debug logs.

The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein to support establishing controlled remote access to debug logs.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 616, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is to execute the processing logic 626 for performing the operations and steps discussed herein.

The computer system 600 may further include a network interface device 622 communicably coupled to a network 625. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Instructions 626 may reside, completely or partially, within volatile memory 604 and/or within processing device 602 during execution thereof by computer system 600, hence, volatile memory 604 and processing device 602 may also constitute machine-readable storage medium 624. The instructions 626 may also implement the log access application 112 and/or access processing tool 119, as described with reference to FIG. 1, to support establishing controlled remote access to debug logs. In another example, the instructions 626 may also implement the access control service 151, as described with reference to FIG. 1, to support establishing controlled remote access to debug logs.

Data storage device 616 may include a computer-readable storage medium 624 (e.g., a non-transitory computer-readable storage medium) on which may store instructions 626 encoding any one or more of the methods or functions described herein.

The non-transitory machine-readable storage medium 624 may also be used to store instructions 626 to support establishing controlled remote access to debug logs described herein, and/or a software library containing methods that call the above applications. While the machine-accessible storage medium 624 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "identifying," "adding," "providing," "reallocating," "generating," "receiving," "selecting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a first computing device, from a second computing device, an encrypted file comprising a debug log;
running, within a trusted execution environment of the first computing device, a log access application;
sending, to the second computing device, a request for access to the debug log by the log access application, wherein the request comprises a validation measurement generated by the trusted execution environment with respect to the log access application;
receiving, from the second computing device, an access key; and
accessing the debug log using the access key, wherein the access key provides controlled access to the debug log based on a security policy associated with the second computing device, wherein the security policy enables partial access to the debug log based on a data type in the debug log.

2. The method of claim 1, wherein the validation measurement comprises a cryptographic hash of executable code of the log access application.

3. The method of claim 1, further comprising:
providing, to the second computing device, a record of access to the debug log by the log access application.

4. The method of claim 1, further comprising:
receiving, from the second computing device an updated access key; and
accessing the debug log using the updated access key.

5. The method of claim 1, further comprising:
displaying a portion of the debug log, wherein the portion corresponds to less than a threshold amount of data to be displayed within a specified amount of time.

6. The method of claim 1, further comprising:
analyzing the debug log; and
providing, to the second computing device, an output generated by the log access application in view of analyzing the debug log.

7. The method of claim 1, wherein the encrypted file comprises the log access application.

8. A system comprising:
a memory; and
a processing device operatively couple to the memory to:
receive, from a computing device, an encrypted file comprising a debug log;
run, within a trusted execution environment, a log access application;
send, to the computing device, a first request for access to a first type of data associated with the debug log, wherein the first request comprises a first validation measurement generated by the trusted execution environment with respect to the log access application;
receive, from the computing device, a first access key, wherein the first access key provides controlled access to the debug log based on a security policy associated with the computing device, wherein the security policy enables partial access to the debug log based on the first type of data; and
access a first portion of the debug log using the first access key, wherein the first portion of the debug log represents the first type of data.

9. The system of claim 8, wherein access to the first portion of the debug log is granted in view of the security policy defined by the computing device for the first type of data, and wherein access to the first portion does not allow access to other portions of the debug log other than the first portion.

10. The system of claim 8, wherein the first validation measurement comprises a cryptographic hash of executable code of the log access application.

11. The system of claim 8, wherein the first access key associated with the first portion of the debug log is stored in a cache memory associated with the processing device for automatically granting access to the first portion of the debug log for a subsequent request for access to the first portion.

12. The system of claim 8, wherein the first portion of the debug log is provided for display and corresponds to less than a threshold amount of data to be displayed within a specified amount of time.

13. The system of claim 8, wherein the processing device is further to:
send, to the computing device, a second request for access to a second type of data associated with the debug log, wherein the second request comprises a second validation measurement generated by the trusted execution environment with respect to the log access application;
receive a second access key; and
access a second portion of the debug log using the second access key, wherein the second portion of the debug log represents the second type of data.

14. The system of claim 13, wherein the processing device is further to:
receive, from the computing device, an updated first access key; and
access the debug log using the updated first access key.

15. A non-transitory computer-readable storage medium comprising instructions that, when executed by a processing device, cause the processing device to perform operations comprising:
receiving, from a computing device, an encrypted file comprising a debug log;
running, within a trusted execution environment of the computing device, a log access application;
sending, to the computing device, a request for access to the debug log by the log access application, wherein the request comprises a validation measurement generated by the trusted execution environment with respect to the log access application;
receiving, from the computing device, an access key; and
accessing the debug log using the access key, wherein the access key provides controlled access to the debug log based on a security policy associated with the computing device, wherein the security policy enables partial access to the debug log based on a data type in the debug log.

16. The non-transitory computer-readable storage medium of claim 15, wherein the validation measurement comprises a cryptographic hash of executable code of the log access application.

17. The non-transitory computer-readable storage medium of claim 15, further comprising:

providing, to the computing device, a record of access to the debug log by the log access application.

18. The non-transitory computer-readable storage medium of claim 15, further comprising:
receiving, from the computing device, an updated access key; and
accessing the debug log using the updated access key.

19. The non-transitory computer-readable storage medium of claim 15, further comprising:
displaying a portion of the debug log, wherein the portion corresponds to less than a threshold amount of data to be displayed within a specified amount of time.

20. The non-transitory computer-readable storage medium of claim 15, further comprising:
analyzing the debug log; and
providing, to the computing device, an output generated by the log access application in view of analyzing the debug log.

* * * * *